United States Patent [19]
Clarke et al.

[11] Patent Number: 6,164,085
[45] Date of Patent: Dec. 26, 2000

[54] METHOD OF CONTROLLING AIR DISTRIBUTION IN A CONTAINER

[75] Inventors: Richard E. Clarke, North Vancouver, Canada; Norman W. Fisher, Bellevue, Wash.

[73] Assignee: Cornerstone Technologies, Ltd., Colombier, Switzerland

[21] Appl. No.: 09/265,766

[22] Filed: Mar. 10, 1999

Related U.S. Application Data

[62] Division of application No. 09/060,230, Apr. 14, 1998, Pat. No. 5,946,933, which is a division of application No. 08/719,695, Sep. 26, 1996, Pat. No. 5,809,798.

[51] Int. Cl.$^7$ .................................................. F25D 17/04
[52] U.S. Cl. ............................. 62/408; 62/89; 62/407; 62/413; 62/414; 62/416; 62/417
[58] Field of Search ............................. 62/89, 407, 408, 62/413, 414, 416, 417

[56] References Cited

U.S. PATENT DOCUMENTS

| | | | |
|---|---|---|---|
| 4,553,403 | 11/1985 | Taylor | 62/407 |
| 4,553,584 | 11/1985 | Bloomquist | 62/407 |
| 4,951,479 | 8/1990 | Araquistain et al. | 62/407 |
| 5,101,643 | 4/1992 | Hicke | 62/407 |
| 5,152,155 | 10/1992 | Shea et al. | 62/407 |
| 5,946,933 | 9/1999 | Clarke et al. | 62/407 |

*Primary Examiner*—William Doerrler
*Assistant Examiner*—Mark Shulman
*Attorney, Agent, or Firm*—Merchant & Gould P.C.

[57] ABSTRACT

Containers for transportation of bulk cargo susceptible to spoilage, that have a controlled temperature profile. The refrigerated containers include opposed insulated side walls each of which include internal channels for carrying return air from the floor of the container upward into a plenum. Each plenum is closed at one end, and in fluid communication with a refrigeration unit at the other end to supply return air to the refrigeration unit. Refrigerated air is blown from the refrigeration unit into a central air distribution duct that extends longitudinally along the roof of the container. The central duct is supplied with a multiplicity of spaced apart apertures, and is preferably tapered from a widest point in the vicinity of the refrigeration unit. Thus, substantially equal refrigerated airflow can be obtained throughout the refrigerated container. The container may also be divided into zones of different temperatures by interposing a shutter arrangement between channels of each of the side walls and their respective plenum. By controlling return airflow front zones of the container, flow of air from the central duct into those zones is also controlled. Alternatively, or in addition, airflow from the central duct may also be controlled by a shutter arrangement.

6 Claims, 9 Drawing Sheets

METHOD OF CONTROLLING AIR DISTRIBUTION IN A CONTAINER

STATEMENT OF RELATED APPLICATIONS

This application is a divisional of U.S. Ser. No. 09/060,230 filed Apr. 14, 1998, which is in turn a divisional application of U.S. Ser. No. 08/719,695 filed Sep. 26, 1996, issued as U.S. Pat. No. 5,809,798.

FIELD OF THE INVENTION

The present invention relates to transportation containers for cargo susceptible to spoilage and more particularly to refrigerated containers.

BACKGROUND

Refrigerated containers are typically used to transport perishable products. Ideally, the refrigerated containers are intended to maintain a substantially uniform and constant temperature throughout the interior of the container in order to efficiently refrigerated all the products and prevent spoilage. Typically, such uniform constant temperatures are not achieved with the result that there is considerable spoilage of cargo.

The industry uses a range of refrigerated containers, each designed for a specific type of transportation system. For example, containers can be designed for use with trucks and truck trailers (e.g., truck-trailer reefers), sea going ships (e.g., marine reefers), or trains (e.g., rail reefers). These refrigerated containers are typically uniformly shaped rectangular boxes that are sized to be efficiently used with the intended transportation system.

In a typical conventional refrigerated container, a simple refrigerated air distribution system is used that includes a refrigerator and a fan disposed at one end of the container to blow the refrigerated cold air longitudinally into the cargo space of the container. This system is unsatisfactory because cold air does not travel the length of the container and is often blocked by cargo. Thus, cargo further from the fan is often not cooled sufficiently and spoils, while cargo nearer the fan freezes. Because the walls of the container may become warm due to ambient outside conditions, the cargo is sometimes spaced from the walls to reduce heat input and resultant spoilage. This, along with a space between the roof of the container and the cargo for cold air flow, reduces the capacity of the container. Some improvements in this prior art design have been proposed. For example, U.S. Pat. No. 5,187,945 entitled "Refrigerated Container" and issued to David A. Dixon Feb. 23, 1993 ("the Dixon patent") discloses a refrigerated shipping container that uses a multiplicity of fans mounted on sides of the container to blow air transversely into the container to ameliorate the air distribution problem. Aside from the weight penalty imposed by the numerous mechanical parts, the design also introduces more heat into the container from the added electrical equipment.

Another factor in maintaining the desired temperature profile in the refrigerated container also addressed by Dixon is the construction of the container's side walls. In Dixon, the side walls are constructed of a corrugated steel outer wall, with a polystyrene insulating slab cemented to its interior surface. A first plastic sheet is then cemented to the polystyrene slab. A second plastic sheet is attached to the first plastic using metal spacers to create an air duct between the two plastic sheets. Thus, the side walls require several layers of different materials and several fabrication steps, which tend to increase the costs of the side walls. Moreover, in use these layers tend to separate, necessitating frequent costly repairs.

Although Dixon's proposed containers represent an improvement over the previous generation of refrigerated containers, the large number of fans and the complexity of the side wall construction lead to relatively high cost, weight, power consumption and maintenance requirements. Accordingly, there is a need for a simple, efficient, low-cost, refrigerated container that uniformly delivers cold air to all parts of the container. Preferably the container should also be subdividable into zones, each of which could be maintained in a selected temperature range.

SUMMARY

The invention provides refrigerated containers with a controllable temperature profile. The container has an air distribution system that distributes cooled or refrigerated air in a predetermined pattern, recovers the air after it has removed heat from the product in the container, and recirculates the air after it has been cooled. Because the distribution of refrigerated air is controllable, the containers of the invention have temperature profiles that are more controllable than the prior art. Thus, the temperature variation throughout the container is significantly reduced. In certain embodiments of the invention, the container is subdivided into zones, each of which receives a controlled distribution of refrigerated air so that each zone is potentially maintained in its own temperature range, suitable for its particular cargo.

The air distribution system of the containers of the invention includes a pair of opposed vertical side walls with vertical airflow channels, a plenum in fluid communication with the vertical channels to receive air from the channels, an air refrigeration unit for cooling air received from the plenum, and a longitudinally extending central cold air supply duct for distributing cold air from the refrigeration unit throughout the container.

In one embodiment of the invention, a side wall through which air can flow vertically includes in order: an outer wall, a corrugated intermediate wall, and a replaceable planar interior panel. The corrugated wall has alternating planar sections and flat-bottomed channel-shaped corrugations, and is oriented so that the corrugations run vertically. The side walls is insulated against heat ingress by a layer of in situ formed foam that is injected between the outer wall of the container and the outboard surface of the intermediate wall. This foam also bonds the intermediate wall to the exterior wall. The lightweight interior panel is mechanically attached to the inboard surface of the intermediate wall to form the inboard face (i.e., facing the interior of the container) of the side wall. As a result, airflow channels are formed between the planar portions of the intermediate wall and the panel. Since the channels run vertically, they allow fluid communication from the floor of the container along the height of the wall. This embodiment of the side wall is lightweight and simple to fabricate.

The plenum extends along the roof and the entire length of the side wall. Along its length, the plenum is in fluid communication with the upper ends of the channels in the side wall. One end of the longitudinally extending plenum is closed and the other is in fluid communication with the refrigeration unit which is located in the vicinity of one end of the container. The refrigeration unit cools the air it draws from the plenum and blows cooled air into the central duct.

The central cold air duct in one embodiment extends along the roof of the refrigerated container, parallel with the longitudinal centerline of the refrigerated container. In other embodiments, it may extend along the floor or sides, and the container may include more than one cold air duct. The central duct is preferably tapered (i.e., widest at the end nearest to the refrigeration unit where cold air enters the duct) and includes at least one longitudinal septum that divides the refrigerated air blown into the central duct and directs the air to different sides, or areas of sides, of the central duct. The tapering of the central duct and the split airflow facilitates even pressurization within the central duct. As a result of this substantially equal pressure distribution of the refrigerated air, the rate of airflow from the central duct through the spaced apertures transversely into the container is substantially uniform along the length of the duct. As will be explained below, airflow out of the duct is further controllable to provide airflow in specific zones if the container is divided into zones.

Airflow through spaced apertures distributed along the length of the central duct allows cold air fluid communication from the duct with the interior of the refrigerated container. The location of the apertures, and the split of airflow in the central duct, provides even distribution of refrigerated air within the refrigerated container, thereby providing the potential for a substantially uniform temperature profile within the refrigerated container. Also, importantly, the use of the central duct allows the refrigeration unit to have a small number of fans, in comparison to the aforementioned Dixon system, thereby reducing costs and complexity.

The air circulation and distribution system circulates air in the refrigerated container according to a unique method of the invention. The refrigeration unit provides refrigerated air to the central duct. The central duct divides and distributes the air substantially equally throughout the interior of the container to maintain a uniform temperature profile. The refrigerated air is drawn downward through the container and absorbs heat from the cargo, becoming warmed "return-air". The return-air is drawn along the container floor toward the open lower ends of the channels in the side walls. The return-air then flows upward through the channels in the side walls and into the plenums. The plenums direct the return-air to the refrigeration unit for cooling to complete the circulation. As a result of the controlled air circulation pattern, the invention is able to achieve a substantially uniform or a controllable temperature profile in any zone of the container, or the entire container.

In an alternative embodiment, when the central refrigerated air duct extends along (or beneath) the floor of the container, cold air flows upward, and transversely away from the duct and floor, to cool the product cargo. The warmed air then enters into upper open ends of the channels in the side walls and is drawn downward into a plenum associated with each side wall, located beneath, and extending along the floor. The plenums direct the warm air to a refrigeration unit at one end of the container, which cools the air and blows the air into the central refrigerated air duct.

Clearly, a similar flow distribution pattern can be achieved with a refrigerated air duct located in a side wall of the container.

In another embodiment of the present invention, the air distribution system includes an adjustable shutter disposed between the plenum and the top end of the channels in the side wall to control fluid communication from the channels into the plenum. The preferred shutter is of two-piece construction: a slat with spaced apertures slidingly engaged in a longitudinal bracket that has matching spaced apertures. The shutter can be slidingly, or otherwise, adjusted or configured to vary the airflow from the channels in the side wall into the plenum. This embodiment is advantageously used in refrigerated containers which are divided by removable or fixed walls into zones, each of which require different temperatures. For example, the refrigerated container may be used to transport several different kinds of products, some of which may not require as severe refrigeration as others.

The shutter can be selectably adjusted to allow return-air to flow from the side wall channels located in one zone of the container to the plenum, while restricting or preventing the flow of return-air from the side wall channels located in another zone of the container to the plenum. The zone or zones associated with the unrestricted or less restricted flow of return-air into the plenum are cooled as described above. In contrast, the zone associated with the more restricted flow of return-air has a greatly reduced flow of refrigerated air from the central duct because of the restricted flow of warmer air out of the zone. Consequently, little or no refrigerated air circulates in this zone. This multi-zone embodiment allows transportation of a variety of products in the refrigerated container, providing flexibility and efficiency. In addition, this embodiment reduces power consumption by avoiding the need to refrigerated zones that contain non-perishable products. Shutters may also be used in the central duct to more evenly distribute the cold air from the refrigeration unit to the various zones. In a further refinement, one or more thermostats, in conjunction with electro-mechanical switches, may be used to adjust the shutter configuration to control the airflow, and hence temperature, of the various zones.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, not to scale, wherein.

DETAILED DESCRIPTION

Figure 1:
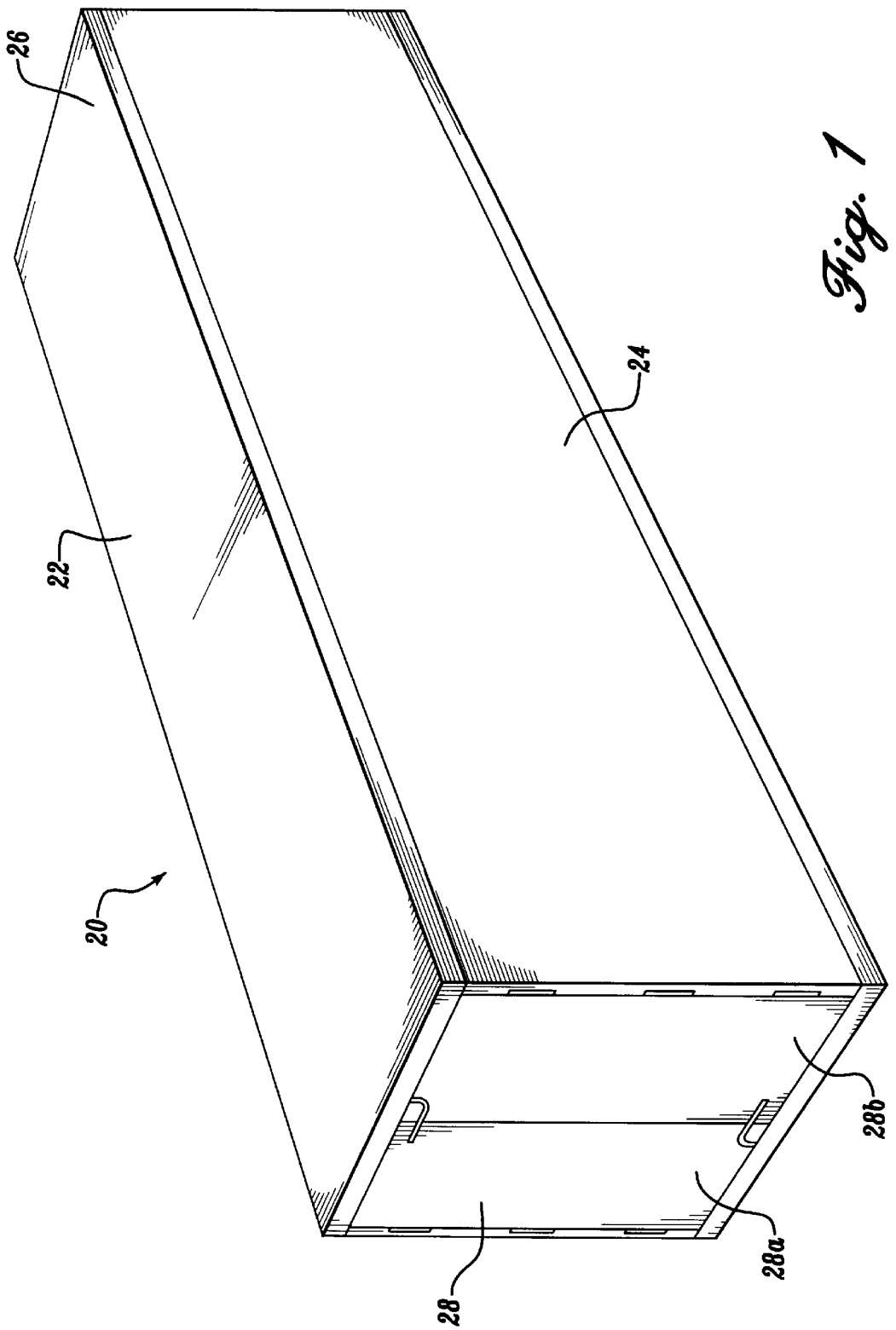
FIG. 1 is a perspective view of the exterior of an example of a refrigerated container.

The invention provides a unique refrigerated container with an air distribution system for controlling and maintaining a predetermined temperature profile throughout its interior. The refrigerated containers of the invention have unique side walls that are both insulated to reduce ingress of heat, and thereby conserve refrigeration unit energy usage, and that contain air flow channels that facilitate the circulation of air in the container. Moreover, the side walls are light weight, and easily retrofitted to existing containers. In another unique feature of the invention, return air for refrigeration is collected in longitudinally extending plenums, one on each side of the container, that are in fluid communication with the channels of the side walls. These plenums, sealed at one end, carry return air to a refrigeration unit located at the other end of the refrigerated container. In certain embodiments, the refrigeration unit may be located outside the container (as is typical in intermodal rail and truck-trailer carriers), while in others (marine carriers), the refrigeration unit is contained within the container, preferably at the end of the container. The refrigeration unit cools the return air, and blows the air into a duct that extends longitudinally along the center of the roof of the container. In a preferred embodiment of the invention, the duct is both tapered from a widest dimension at the end in the vicinity of the refrigeration unit, to the other end, and is divided by at least one longitudinally extending septum. Air apertures, or diffusers, are located at spaced intervals along the length of the central duct so that refrigerated air flows transversely from the duct into the interior of the container. During normal operation, this cold air cools product inside the container and is slowly drawn toward the floor of the container. The container floor is, as is conventional, formed of cross-drilled T-shaped elongate members. The air, having cooled the cargo, flows along the floor to inlet ends of the channels of the side walls for recirculation to the refrigeration unit.

In a further unique feature of the invention, longitudinal shutters are interposed between the plenums and the upper ends of the channels of the side walls. Adjustment of these shutters controls the volume of air withdrawn from the zones of the container adjacent to the shutters. Thus, by controlling the airflow distribution, the invention permits maintaining different subdivided zones of the container at different temperatures, as desired. Preferably, the shutters are located in the "suction side" of the air distribution system, in this case between the plenum and side wall, to maintain a positive pressure in a zone where the shutter is closed or restricts flow. This minimizes possible ingress of warm outside air.

The invention also provides a unique method of controlling the interior temperature of a refrigerated container. In accordance with this method, air is drawn from the base of the side walls vertically upward along the sides of the container, and is then channeled toward a first end of the container. The channeled air is refrigerated and then below toward the opposite end of the container, preferably while maintaining substantially constant pressure along the length of the blown refrigerated air stream. At intervals, air is bled off from the longitudinally blown air stream to flow transversely into the interior of the container, where it is gradually drawn downward, toward the base of the container and thence the base of the side walls, where the process then recommences.

The following FIGURES illustrate preferred embodiments of the invention, and do not limit the scope of the invention as disclosed herein, and claimed herebelow. The FIGURES are intended to facilitate a better understanding of the invention. Thus, FIG. 1 is a rear perspective view of a container 20 that has a roof 22, a pair of side walls 24, a front end 26, and a rear end 28. The rear end, as is frequently convention, has two doors 28a and 28b that open outward.

The term "inboard" means facing toward or nearest the interior of the container, and the term "outboard" means facing away from or farthest from the interior of the container.

Figure 2:
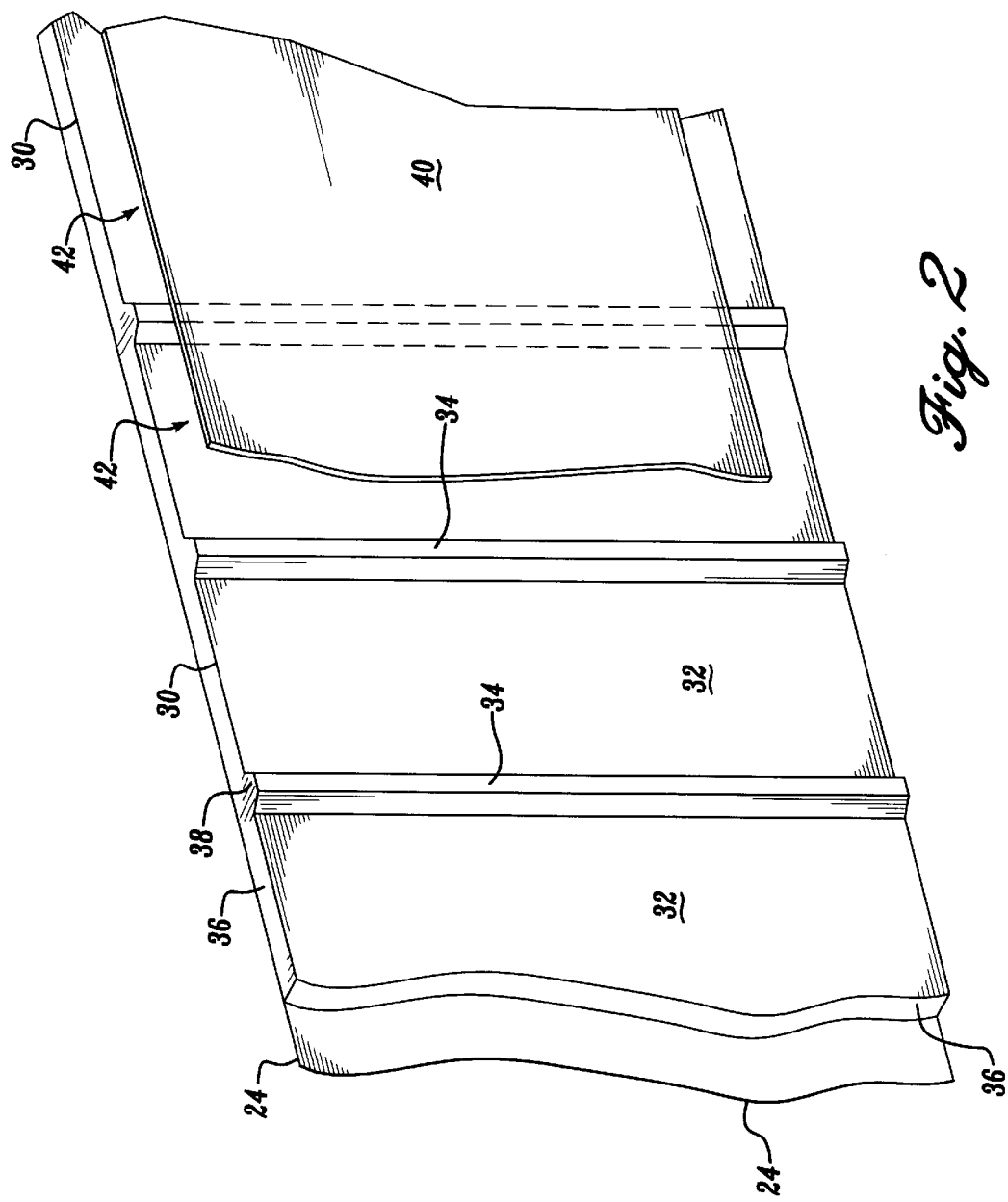
FIG. 2 is a schematic perspective view, in partial cross-section, of an embodiment of an insulated side wall of a refrigerated container, in accordance with the invention.

FIG. 2 is a schematic illustration of a preferred embodiment of one of the pair of side walls in accordance with the invention, that are both heat-insulated and adapted for conducting air vertically. In the embodiment shown, an intermediate wall 30, preferably fabricated from a thin sheet of material, such as aluminum, composite, or steel, with planar sections 32 each separated by spaced flat-bottomed vertical corrugation 34, is spaced form the inboard side of the outer side wall 24. A layer of foam heat-insulation 36 is formed in situ between the inboard face of the outer wall 24, and the outboard face of the intermediate wall 30. Preferably, this layer of insulation has a thickness of from about 1 inch to about 2 inches, to provide the required resistance to heat transfer into the container. The in situ formed foam insulation is also tightly adherent to both the inboard surface of the outer wall 24, and the outboard surface of the intermediate wall 30, so that two walls are effectively bonded together. An interior planar wall panel 40 is then attached to the inboard surface of the intermediate wall 30. The interior panel 40, shown broken in FIG. 2 to permit illustration of details of intermediate wall 30, extends along the entire length of the interior side walls of the container but is spaced from the interior floor 25a and the roof lining 22a (not shown in this FIGURE). Attachment is preferably by mechanical attachment through rivets that penetrate the panel 40 and the flat bottoms of the channels 34 (of the intermediate wall 30) that are each reinforced with a vertically-extending metallic slat 38. This slat provides additional stiffness and rigidity so that the panel 40 is firmly attached to the intermediate wall 30. By forming the side walls of a sandwich of an intermediate wall 30 that has alternating planar sections and flat-bottomed corrugations, and a panel 40, airflow channels 42 are created between the panel 40 and the planar sections 32 of the intermediate wall 30.

Figure 3:
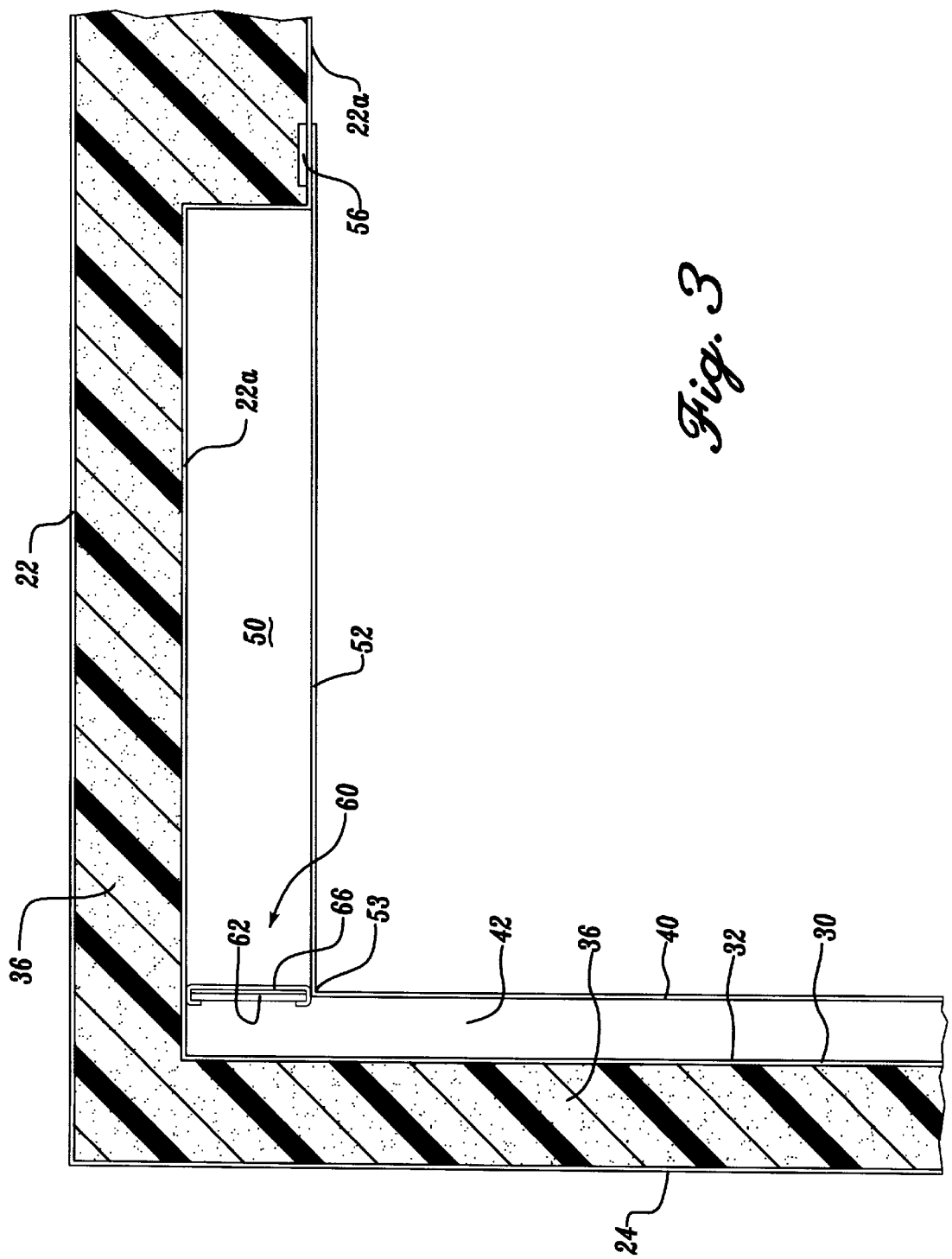
FIG. 3 is a schematic cross-sectional end view of an upper section of an embodiment of a refrigerated container in accordance with the invention.
Figure 4:
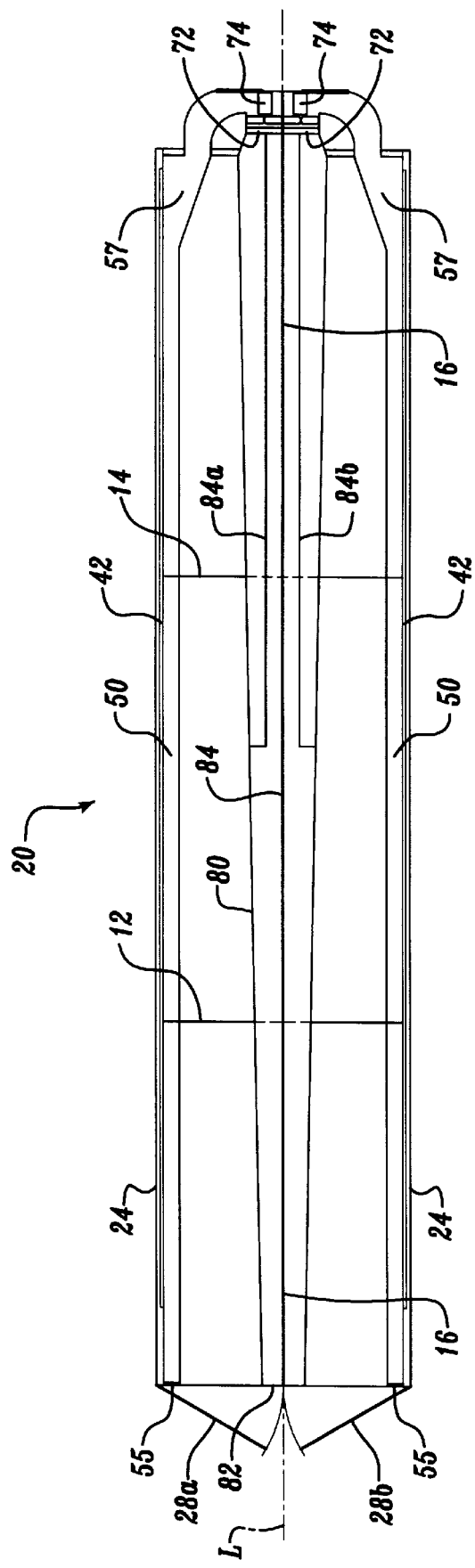
FIG. 4 is a top view of an embodiment of a refrigerated container in accordance with the invention, with the roof removed to show internal details.
Figure 8A:
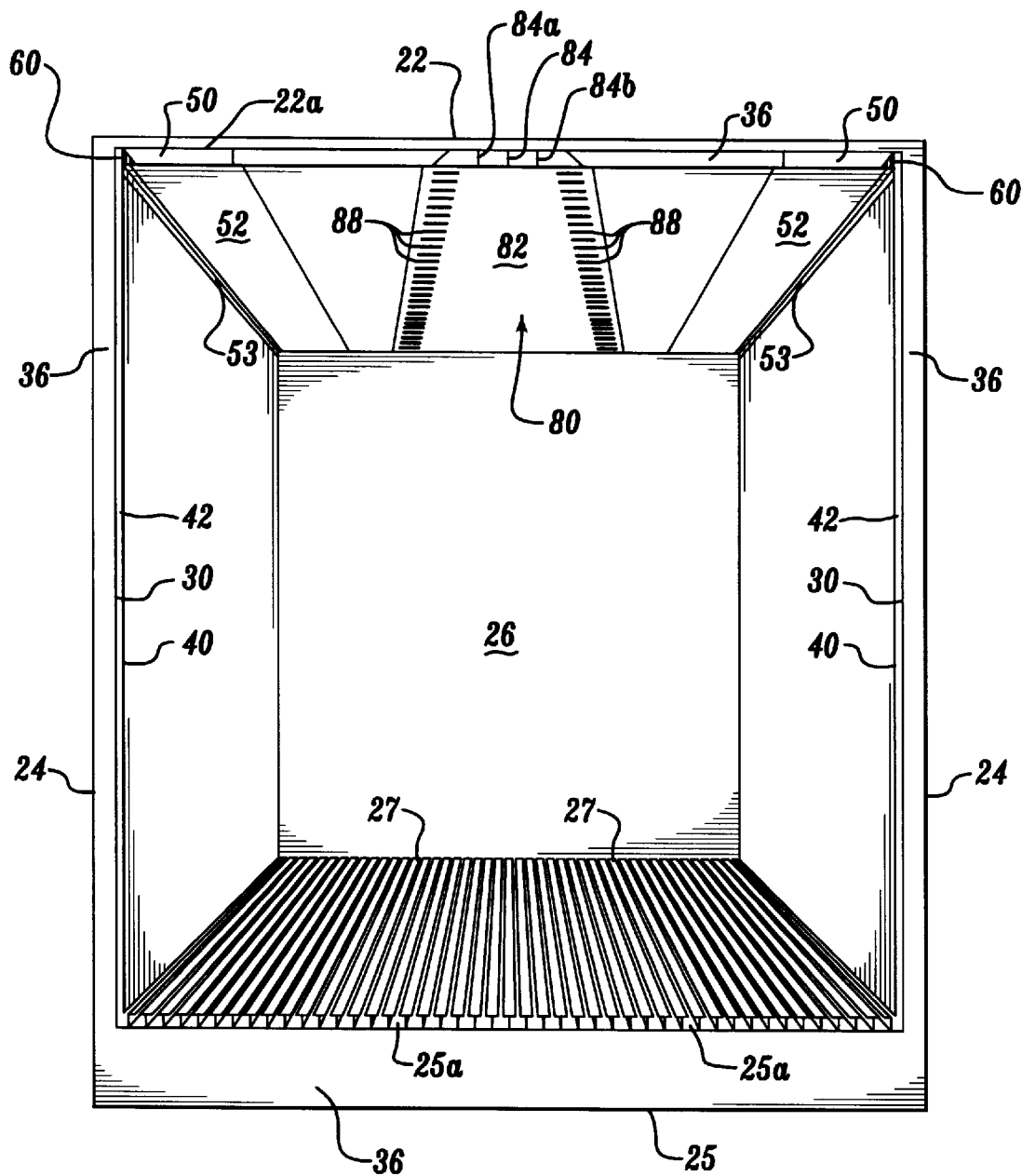
FIG. 8A is a perspective view of an interior of an embodiment of the containers of the invention.

As shown in FIG. 3, illustrating a portion of a cross section through an upper end of one side of the interior of an exemplified container 20, the interior space of the air flow channels 42 is in fluid communication with a rectangular plenum 50 formed between the roof lining 22a, and a substantially horizontal longitudinally extending plenum base plate 52. The roof lining 22a is spaced from the roof, and has a longitudinally extending rectangular trough that forms the plenum 50 between the roof lining and the plenum base plate 52. The space between the roof lining 22a and the roof 22 is filled with a heat-insulating foam material 36 to reduce heat ingress into the container. Preferably, the base plate 52 of the plenum is hingedly connected (by hinge 53) along its length to the interior wall 40, for ease of maintenance, and is held in place by a mechanical clasp 56 at spaced apart points in the vicinity of an inboard edge of base plate 52. Thus, as shown in FIGS. 4 and 8A, a pair of parallel longitudinal plenums 50 extend along the upper sides of the container 20. Of course, other than rectangular plenums are also useful.

Figure 5A:
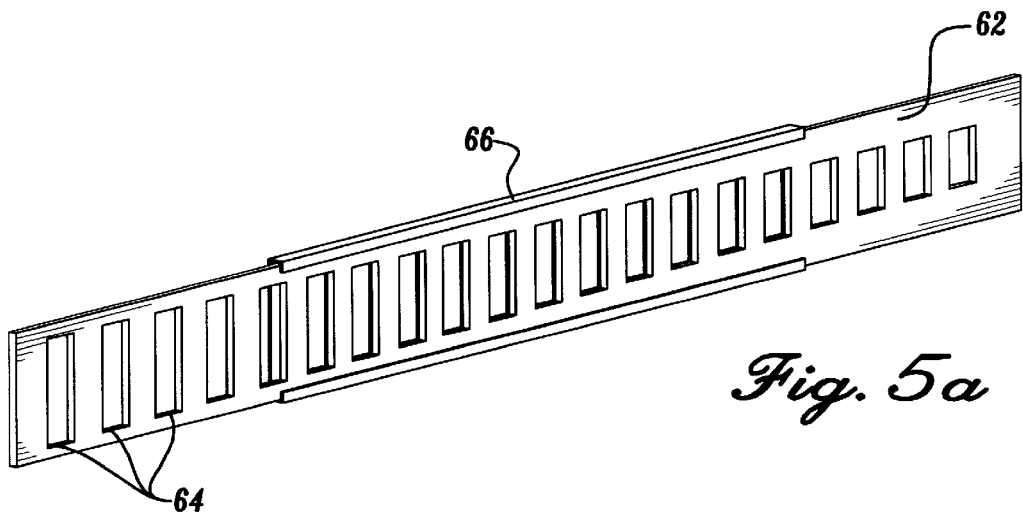
FIG. 5A is a perspective view of an embodiment of the shutters of the invention that control air distribution in refrigerated containers.
Figure 5B:
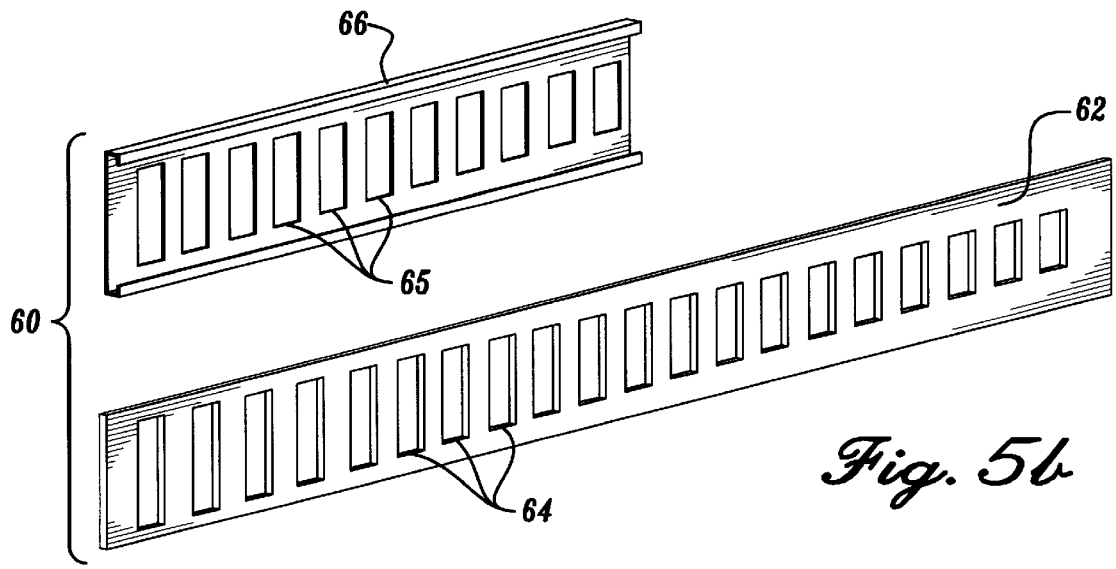
FIG. 5B is an exploded view of the shutter of FIG. 5A.

In order to control airflow from channels 42 into each plenum 50, a continuous shutter arrangement 60 is interposed between each of the channels 42 and the plenum 50, as shown in FIGS. 3 and 8A. FIG. 5A is a schematic illustration of this type of shutter, shown in a front perspective view. The shutter arrangement 60 includes a longitudinally extending slat 62 that includes a plurality of spaced-apart apertures 64, in this case rectangular in shape. The apertures having increasing area for throughflow of air with distance from the cold air supply. Selection of this variation of area versus distance ensures a more constant fluid pressure along the length of the plenum, when the shutter is fully open, to enhance uniform air distribution in the container. The slat is slidably engaged in a back plate 66 with apertures 65 that essentially duplicate the spaced aperture arrangement of the slat 62, as shown in FIG. 5B. Thus, as the slat 62 slides in the rails of the back plate 66, the apertures (64, 65) either fully coincide, to thereby provide maximum fluid communication between channels 42 and plenum 50, or are maintained in some intermediate offset positions to restrictively control the quantity of fluid flow, or the apertures do not coincide at all, so that airflow is shut off. Though this simple and unique arrangement, the invention controls the fluid distribution to various zones of the refrigerated container, as is explained more fully below.

Figure 6:
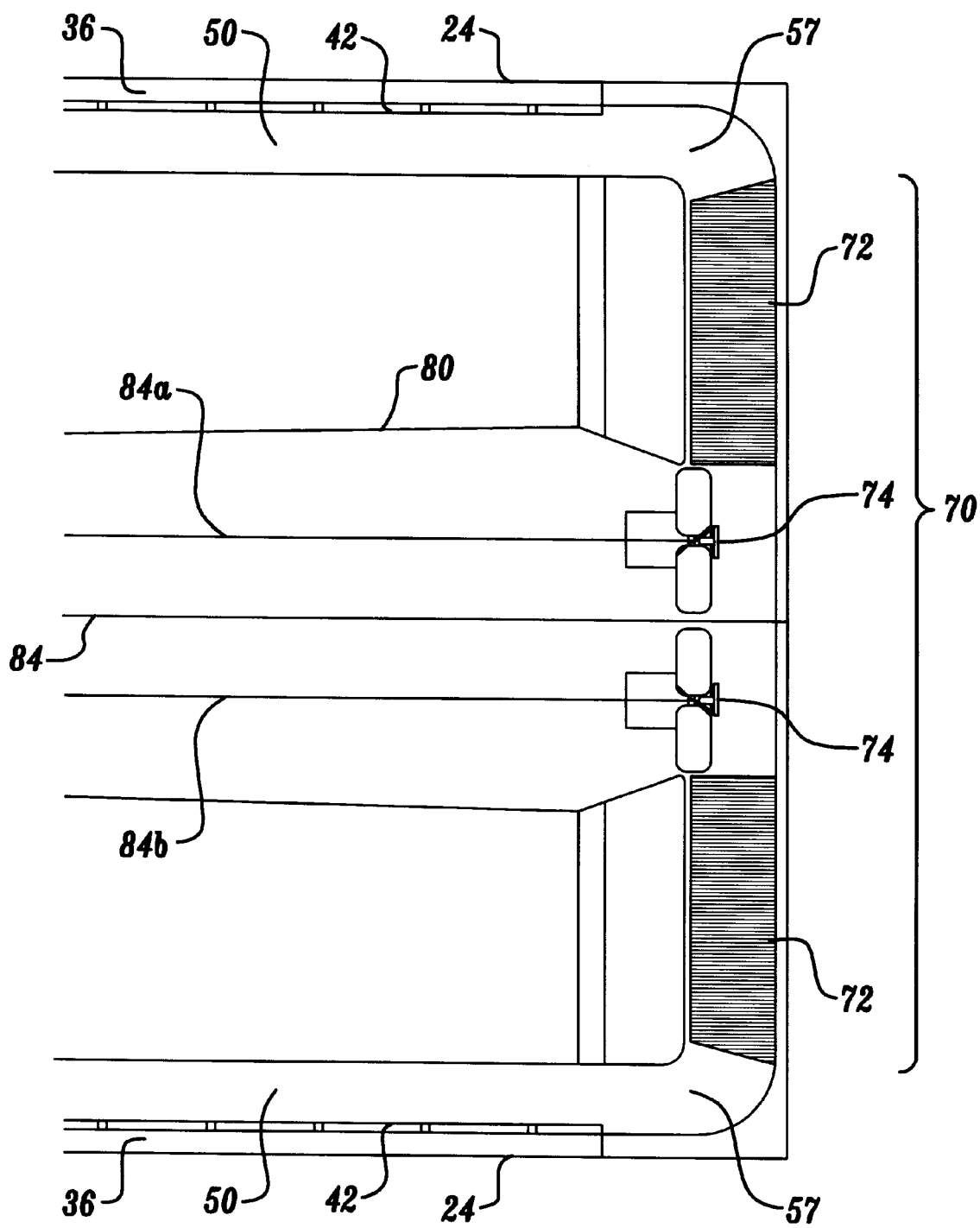
FIG. 6 is an enlarged end view illustrating details of the plenum, refrigeration unit, and central duct fluid communication, of the embodiment of FIG. 4.

As shown in FIG. 4, a simplified plan view of an embodiment of a container 20, with the roof 22 and the roof lining 22*a* removed, the container has a longitudinal plane of symmetry L. Identical items on either side of the plane have the same identifying numerals, and for ease of description, only one side will be described. The container 20 may be subdivided into several zones by lateral or longitudinal walls, as shown in FIG. 4, which has lateral, removable walls 12 and 14 and a removable longitudinal wall 16 dividing the container into 6 zones. Clearly, more or less zones are readily created. Each of the ends 55 of the longitudinally extending return air plenums 50 is closed off. The other end 57 of each plenum extends into a zone 70 at the end of the container where a refrigeration unit is mounted. As shown in FIG. 6, with reference to one of the plenums 50 for simplicity, the end 57 of the plenum is in fluid communication with cooling coils 72 of the refrigeration system. In accordance with the invention, conventional refrigeration systems may be adapted for use with the invention. After reading this disclosure, persons of ordinary skill in the art will readily understand how to make these adaptations. The refrigeration system shown is "forced draft" in the sense that warm air from the plenum is induced into the suction ends of fans 74 and then forced through the refrigeration coils 72. The cold air is then blown into a longitudinally extending central duct 80. In the embodiment shown in FIG. 6, the refrigeration system is of an induced draft type with fans 74 drawing air through the coils 72. Other arrangements and numbers of fans and coils are also feasible. As shown more clearly in FIGS. 4 and 7, the central duct 80 extends from the vicinity of the refrigeration unit, along the entire length of the refrigerated container and terminates in a closed end 82 in the vicinity of the end of the container remote from the refrigeration unit. In this instance, the duct 80 is divided by a central longitudinally extending septum 84 that effectively divides the duct 80 into two halves. Each lengthwise half of the duct is then further divided into a forward end and aft section by dividers 84*a* and 84*b* that extend longitudinally to about midway along the length of the duct to terminate in a blinded off end. This facilitates more even distribution of air flow from either side of central septum 84 to the front and rear of the container.

Figure 7:
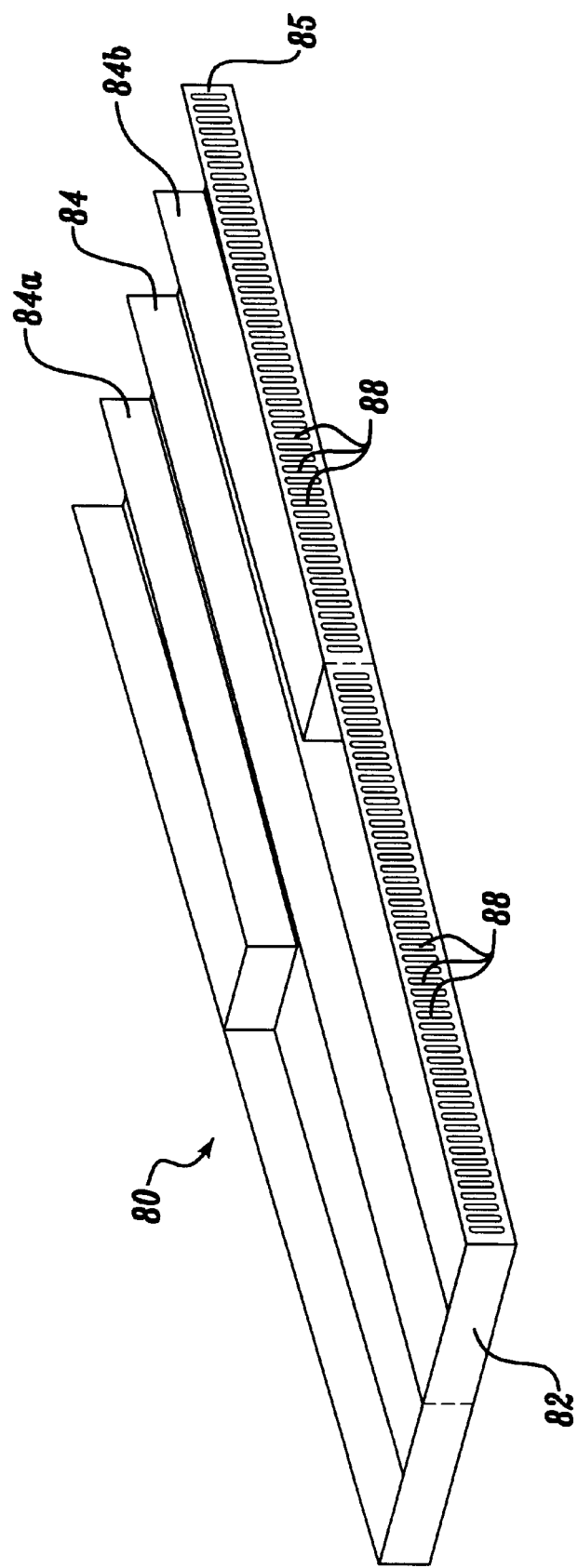
FIG. 7 is a schematic perspective view an embodiment of the central duct for distributing refrigerated air throughout the interior of refrigerated containers of the invention.

FIG. 7 is a simplified perspective view, showing details of an embodiment of the central duct 80. As shown in this example of a duct, each outboard-facing vertical side 85 of the duct 80 is equipped with a series of spaced-apart apertures 88. Preferably, the duct 80 is tapered from its inlet end in the vicinity of the fans to its sealed-off terminal end 82. This taper, in conjunction with predetermined spacing and sizing of apertures 88, ensures a substantially equal pressure distribution of air within the duct 80. Thus, the airflow rate from the apertures into zones of the container, whether immediately downstream of the fans 74, or near the terminal end of the duct 82, can be maintained at substantially the same rate. Air flowing out of these apertures 88 into the interior of the container travels downward, over any cargo in the container, toward the floor lining 25*a* of the container, as seen more easily from FIG. 8A, using an alternative embodiment of the duct 80. In the alternative embodiment shown, the duct has no vertical sides 85, but is embedded in a cavity in the roof lining 22*a*. The apertures 88 are located along outboard edges along the length of the duct 80. The duct is held in place mechanically by fasteners and the septa 84, 84*a* and 84*b* are preferably hung from the roof lining 22*a*. As shown, the floor lining 25*a* includes a series of spaced-apart T-shaped members 27. Thus, when the air from the duct 80 reaches the floor of the container, it is able to flow along the floor lining 25*a* into the side wall channels 42, via the spacing between the interior wall panel 40 and the floor lining 25*a*. Thence, the air circulates upward in the vertical channels 42 and into the plenum 50, as described above.

The cross-sectional view of FIG. 8A illustrates schematically one of the preferred embodiments of the invention, in simplified form. The embodiment illustrates the cargo space, bounded by interior sidewalls 40, floor lining 25*a*, and inner roof lining 22*a*. This cargo compartment is effectively insulated from heat ingress by a surrounding layer of heat insulating foam 36. In this particular embodiment, the roof lining 22*a* is configured to form three separate parallel longitudinally-extending, substantially rectangular troughs or channels. The central channel is shaped and sized to form the central air duct 80 that is divided by a central septum 84, and further subdivided by septums 84*a* and 84*b*, as described above. The lower plate 82 of the duct 80 is supplied with a plurality of apertures 88, as previously described above, along both of its longitudinally-extending edges, and is mechanically fastened to the roof lining 22*a*. The other two roof channels are covered with hinged and clasped base plates 52 to form the return air plenums 50. These plenums are in fluid communication through shutter arrangement 60, with sidewall channels 42. The lower ends of the sidewall channels 42 are in fluid communication with the volume in the vicinity of the floor lining 25*a* of the container.

Figure 8B:
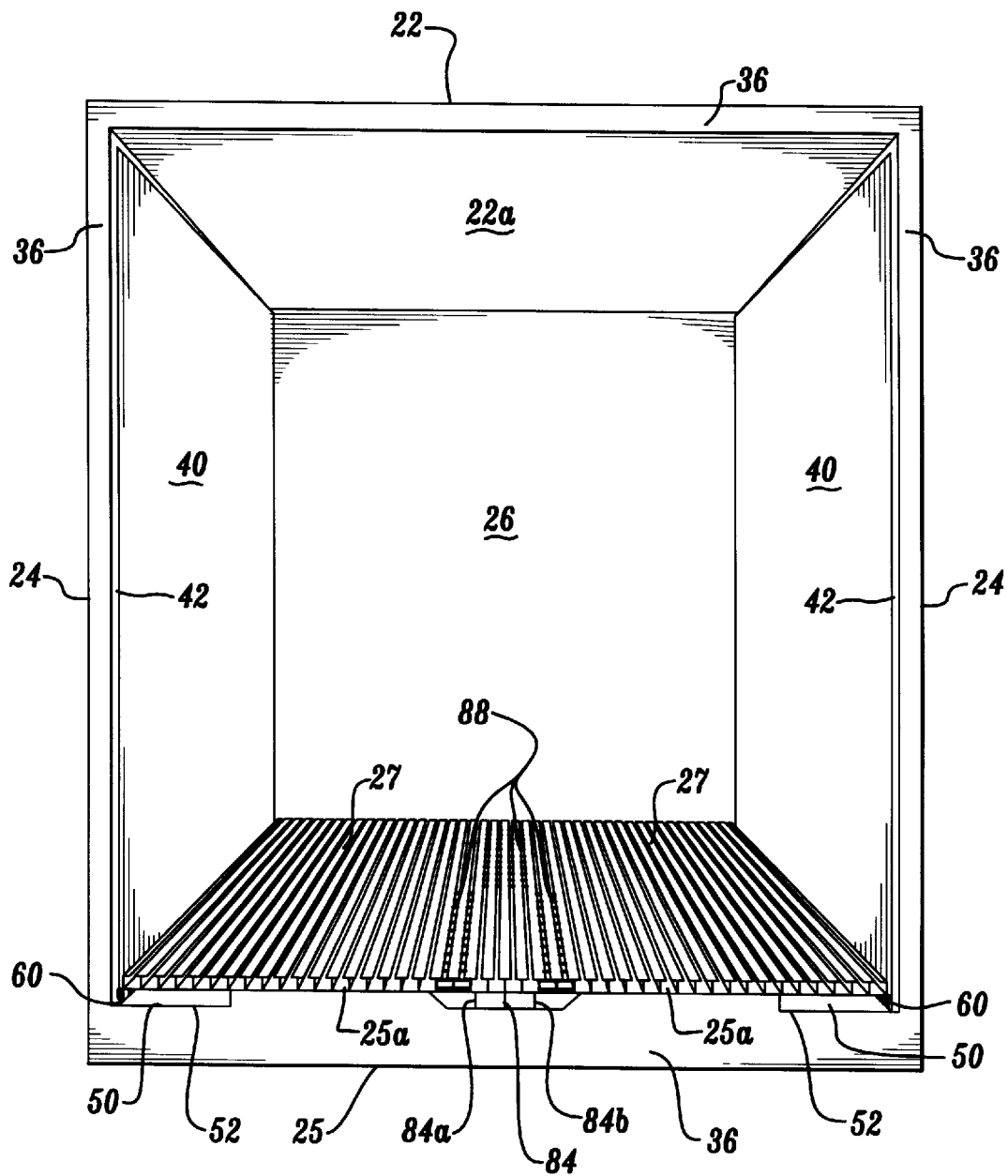
FIG. 8B is a perspective view of an interior of an alternative embodiment, with the central cold air duct located beneath the floor lining of the container, and the plenums likewise beneath the floor lining.

In an alternative embodiment illustrated in FIG. 8B, the design of FIG. 8A is substantially reversed. Ordinarily, this type of design is not preferred because it requires flow of air upward from the floor, that is covered with cargo. Thus, the bulk of the cargo may hinder circulation of air significantly. Nevertheless, in certain applications, this type of arrangement may prove useful. In this instance, three longitudinally-extending, substantially rectangular channels are formed in the heat insulation underlying the floor lining 25*a* of the container. The channels extending along the side walls form the plenums 50, that are in fluid communication through a shutter arrangement 60 with cavities 42 of the side walls of the container. Clearly, in this instance, the panels 40 of the side walls extend downward to the floor lining 25*a* of the container, so that there is no fluid communication between the lower ends of the channels 42 and the volume of air in the lower part of the container. Instead, the side walls 40 do not reach completely to the inner roof 22*a* of the container, thereby permitting fluid communication between channels 42 and the air in the upper section of the container.

The central air duct, located in the central channel formed in the floor lining 25*a*, is again subdivided, as previously described, by septums 84, 84*a*, and 84*b*. However, the apertures 88 are now oriented to discharge air upward (and transversely outward) into the container's interior space. As noted above, the T-shaped members extending longitudinally along the floor of the container are cross-drilled so that cold air is able to travel along the floor, transversely outward, even when cargo is placed directly above the duct 80. The cold air flows upward, as it is warmed, and ultimately enters into the air channels 42 of the side walls, in the vicinity of the roof lining 22*a* of the container. The air then flows through shutter arrangement 60 into the plenums 50. This return air is then cooled, as explained above with reference to FIGS. 4 and 6, before being returned into the inlet end of duct 80.

Accordingly, the invention also provides a "reverse method" of air distribution flow. Thus, according to this method, cold air is directed longitudinally from one end of a container to another, under controlled pressure. Air is distributed from this longitudinal cold air stream transversely outward into the container and flows upward in the container space while increasing in temperature. The air is then drawn downward, along sides of the container, toward the floor. The warmed air is then drawn toward the end of the container from which the cold air emanates, and undergoes refrigeration. Thereafter, the refrigerated air is recycled, as explained above.

Although only a few exemplary embodiments of this invention have been described in detail above, those skilled in the art will readily appreciate that many modifications are possible in these exemplary embodiments, without materially departing from the novel teachings and advantages of this invention. Accordingly, all such modifications are intended to be included within the scope of this invention, as defined in the following claims. In the claims, any means plus function clauses are intended to cover the structures described herein as performing the recited function, and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The embodiments of the invention in which an exclusive property or privilege is claimed are defined as follow:

1. A method of controlling the temperature profile in a refrigerated container, the method comprising:

(a) drawing return warmed air vertically downward along sides of the container;

(b) drawing the air longitudinally, along the vicinity of a floor of the container, towards a first end of the container;

(c) cooling the drawn air;

(d) blowing cold air longitudinally in an air stream, in a duct, along the vicinity of the floor of the container toward a second end of the container;

(e) distributing air transversely outward from the blown airstream into an interior space of the container; and (f) repeating steps (a) to (e).

2. The method of claim 1, wherein the blowing of cooled air longitudinally comprises blowing cooled air in an air stream that has substantially equal pressure along a length of the air stream.

3. The method of claim 1, comprising controlling rates of drawing air vertically downward in at least two different zones of the container.

4. A method of controlling the temperature profile in a refrigerated container, the method comprising:

(a) drawing returned warm air vertically downward along sides of the container;

(b) drawing the air longitudinally along a floor region of the container, toward a first end of the container;

(c) cooling the longitudinally drawn air;

(d) blowing the cooled air longitudinally from the first end of the container toward an opposite second end of the container; and (e) controlledly distributing the longitudinally blown cooled air into the container at predetermined locations.

5. The method of claim 4, wherein the blowing of cooled air longitudinally comprises blowing cooled air into a duct extending along the vicinity of the floor of the container and pressurizing the air in the duct.

6. The method of claim 4, wherein the longitudinally blown cooled air of step (d) is subject to back pressure causing substantially equal pressure to arise along the length of an air stream comprised of said blown air.

* * * * *